Aug. 19, 1941.                J. T. MARTIN                2,252,894
                              CALF WEANER
                          Filed Jan. 15, 1940
Fig. 1.
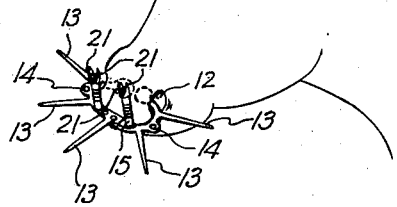
Fig. 2.
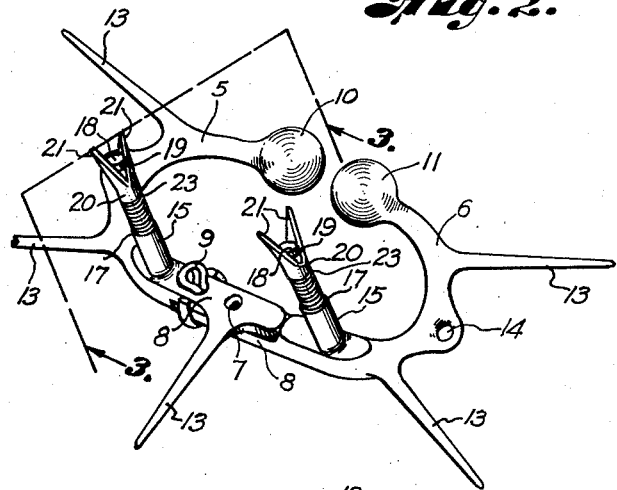
Fig. 4.
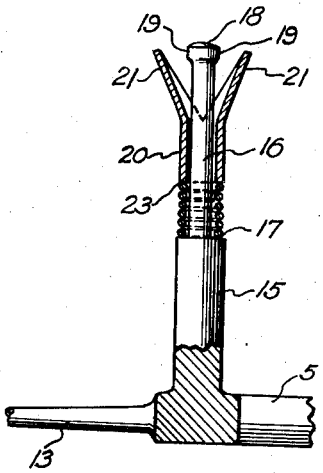
Fig. 3.
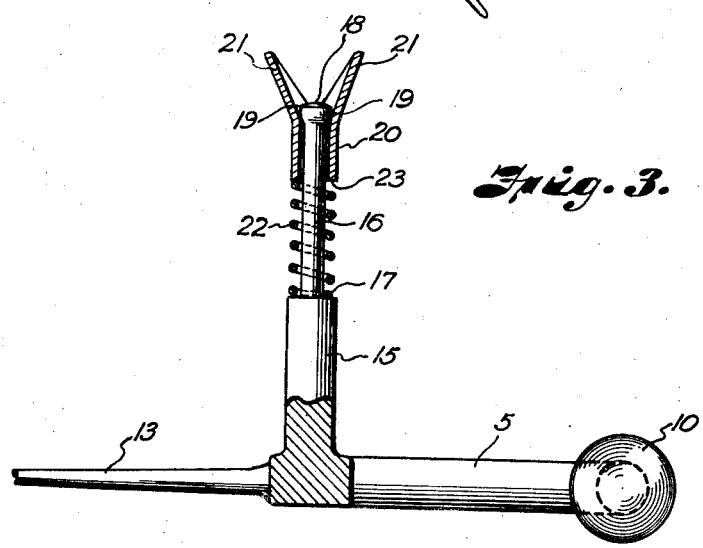
INVENTOR
John T. Martin
BY Alfred R. Fuchs
ATTORNEY Patented Aug. 19, 1941

2,252,894

UNITED STATES PATENT OFFICE 2,252,894

CALF WEANER

John T. Martin, near Hanover, Kans.

Application January 15, 1940, Serial No. 313,964

8 Claims. (Cl. 119—132)

My invention relates to calf weaners of the type that fasten in the nostrils of the calf.

It is a purpose of my invention to provide a device of the above mentioned character, which will avoid the objections encountered with calf weaners now commonly in use. The ordinary calf weaning device that is found to be the most satisfactory, which was used prior to my invention, comprises a body portion that is adjustable to engage in the nostrils of the calf and which has prongs, or spikes, that project outwardly therefrom both laterally and upwardly when the device is in position in the animal's nostrils. This device has a tendency, if it becomes disengaged from the nostrils of the calf, to assume either one of two positions when it falls to the ground. Either the prongs, or spikes, that extend upwardly will be in a downward position in engagement with the ground, or will extend upwardly, with the normally under side of the device in engagement with the ground. The under side of the device being adapted to lie substantially flatly in engagement with the ground, the prongs will be in a position in which the same will penetrate the foot of an animal stepping on the same, causing serious injury and frequently death of the animal due to infection.

It is a purpose of my invention to provide a calf weaning device of the above mentioned character, which avoids the above mentioned objection to the same, by providing upstanding prong members thereon that are retractable and which will retract into a position such that the same will not enter the foot of an animal treading upon the same when the device is accidentally dropped off the calf in the barnyard, or other place where other animals might come in contact therewith.

This is accomplished by providing post-like members of high quality steel on the calf weaner, that project upwardly therefrom, and which are provided with means for slidably mounting a pronged member of high quality steel tubing thereon, and means for spring projecting this pronged member beyond a combined stop and guard means under ordinary circumstances, but which will retract, or recede, sufficiently far, when pressure is exerted on the prongs, that the prongs will at least not project beyond a blunt end or head on the guiding means, acting as guard means that prevents the entry of the prongs into the foot of the animal to an extent that any damage could be done thereby, when the animal treads on the device.

It is also a purpose of my invention to provide prongs on a calf weaner that have keener points and a larger number thereof than the weaners now on the market, which are ordinarily made of pot metal or malleable iron and have relatively dull points and only one point to each prong, instead of paired points, as in my invention.

Other objects and advantages of my invention will appear as the description of the drawing proceeds. I desire to have it understood, however, that I do not intend to limit myself to the particular details shown or described, except as defined in the claims.

In the drawing:

Fig. 1 is a perspective view of my improved calf weaner, showing the same applied to the calf, the head of a calf being shown diagrammatically.

Fig. 2 is an enlarged perspective view of the device shown in Fig. 1, partly broken away.

Fig. 3 is a section taken on a plane indicated by the line 3—3 of Fig. 2, certain parts being in elevation, and Fig. 4 is a view similar to Fig. 3 of the device shown in Fig. 3, with the pronged member in retracted position.

Referring in detail to the drawing, my improved calf weaning device comprises a body portion made up of a pair of curved members 5 and 6, which are connected together by means of a pivot pin 7, the overlapping ends of the members 5 and 6 being reduced in thickness, as at 8 and 9, so as to provide flattened portions forming a hinge joint at the overlapping portions of the members 5 and 6 of substantially the same thickness as the remainder of the portions 5 and 6, which is stiffened in a direction parallel to the axis of the hinge pin, or pivot pin, 7.

A pair of aligning holes is provided in the members 5 and 6, through which any suitable fastening means, such as a cotter pin 9, may be extended for securing the members 5 and 6 in the position shown in Fig. 2. The device is, of course, applied to the calf in a well known manner, by removing the fastening element, such as the cotter pin 9, and swinging the members 5 and 6 into an open position so that the ball-like end portions 10 and 11 are spaced far enough that the same can be inserted in the nostrils 12 of the calf, and then swung back into a position in proximity to each other as shown in Fig. 2, after which the cotter pin 9, or other fastening means, is inserted to hold the same in position in the form of an elongated loop, that is substantially closed except for the slight space between the ball ends 10 and 11 that are in the nostrils of the calf. The members 5 and 6 are ordinarily provided with a plurality of elongated spikes, or prongs, 13, which radiate from the outer convex side of the curved members 5 and 6, one of said prongs extending, preferably, forwardly when the device is in position on the calf, and a pair thereof extending substantially sideward from the nose of the calf when in position on the animal, with another pair of prongs 13 lying between the central forwardly projecting prong and the sidewardly projecting prongs 13. The forwardly projecting prong 13 is provided on one of the members, such as the member 5, and is substantially in alignment with the pivot pin 7.

It is also common practice to provide a pair of eyes 14, one on each of the members 5 and 6. Ordinarily, a pair of prongs, or spikes, also project upwardly from the body portion made up of the members 5 and 6, and are made in the same manner as the prongs, or spikes, 13. However, it is these prongs, or spikes, that make the use of a device of the general character referred to herein objectionable, as previously made. My improvement eliminates these upstanding spikes, as previously known, and provides pronged means that are just as effective for weaning purposes as the ordinary spike-like rigid prongs that are provided on the ordinary calf weaner, but which avoid the objections thereto, such as above referred to.

Instead of providing the upstanding spikes, similar to the members 13, as has been previously the case in devices of this character, I provide a pair of post-like members 15 on said body portion, one on the member 5 and the other on the member 6, the same being arranged on each side of the pivot 7. A rod-like member 16 extends from the post 15 and is of smaller diameter than the post 15 to provide a shoulder 17. Said rod-like member 16 may be integral with the post-like member 15 and is shown as being such, although not necessarily integral therewith. The rod-like member 16 is headed as shown at 18 at the extremity thereof remote from the shoulder 17, said head being preferably flattened on opposite sides thereof, as indicated at 19.

Mounted on the post-like member 15 in embracing relation to the rod-like member 16 is a prong carrying member having a sleeve-like tubular body portion 20, which loosely slidably engages the rod-like member 16, but which is of smaller diameter than the head 18, thus limiting outward projection of the pronged member to the position shown in Fig. 3. A plurality of prongs 21 are provided on the pronged member that has the tubular body portion 20. Preferably, two of these sharpened points, or prongs, flaring outwardly, or diverging from each other, the tubular portion 20, are provided on each of said members, and the flat inner faces of the pronged members 21 are engaged by the flat sides 19 on the heads 18 to aid in the guiding of the pronged members and tend to prevent rotation thereof on the rod-like member 16.

Said pronged members are projected to the position shown in Fig. 3 by a compression coil spring 22 mounted between the end 23 of the tubular body portion 20 of the pronged member and the shoulder 17, said spring being of such a size and character that the prongs 21 can be retracted to the position shown in Fig. 4, with the head 18 on the member 16 extending slightly beyond the prongs 21 to support the foot of an animal when it engages with said upstanding pronged member in the event that the weaner should be lost off the calf and be lying on the ground, where the same might be stepped on by an animal. The prongs 21 serve as effectively as the sharpened ends of the spikes 13 for weaning purposes, and by providing a retractable pronged member that can be depressed to such a point that the weight of the animal, acting through the foot thereof, will be transferred to the post-like member 16 through the blunt end thereof provided by the head 18, such penetration of the foot of an animal will be prevented that an injury that might be dangerous to the animal cannot result from stepping on the device of the invention, even if it is lying flat on the ground with the post-like members 15 and their pronged members mounted thereon projecting vertically upwardly from the body portion of the weaner.

What I claim is:

1. In a calf weaner, a body portion comprising a pair of curved members connected together to provide a pair of movable jaws, spikes extending outwardly from said curved members, said spikes and said curved members having substantially a common medial plane, a pair of post-like members projecting from said body portion at an angle to said plan, a retractable pronged member mounted on each of said post-like members, a guard for said pronged member projecting endwise beyond said retractable member in its retracted position, and yielding means for projecting said pronged member endwise beyond said guard.

2. In a calf weaner, a body portion comprising a pair of curved members connected together to provide a pair of movable jaws, a pair of post-like members projecting from said body portion, a retractable pronged member mounted on each of said post-like members, a guard for said pronged member projecting endwise beyond said retractable member in its retracted position, and yielding means for projecting said pronged member endwise beyond said guard.

3. In a calf weaner, a body portion comprising a pair of curved members connected together to provide a pair of movable jaws, spikes extending outwardly from said curved members, said spikes and said curved members having substantially a common medial plane, a pair of post-like members projecting from said body portion at an angle to said plane, a blunt ended rod-like member extending endwise from each of said post-like members, a pronged member slidably mounted on said rod-like member, a spring projecting said pronged member endwise beyond the blunt end of said rod-like member and means for limiting the projection of said pronged member by means of said spring.

4. In a calf weaner, a body portion comprising a pair of curved members connected together to provide a pair of movable jaws, a post-like member projecting from said body portion, a blunt ended rod-like member extending endwise from said post-like member, a pronged member slidably mounted on said rod-like member, a spring projecting said pronged member endwise beyond the blunt end of said rod-like member and means for limiting the projection of said pronged member by means of said spring.

5. In a calf weaner, a body portion comprising a pair of curved members connected together to provide a pair of movable jaws, spikes extending outwardly from said curved members, said spikes and said curved members having substantially a common medial plane, a pair of post-like members projecting from said body portion at an angle to said plane, a headed reduced extension on each of said post-like members, a sleeve-like member mounted on said extension, said sleeve-like member having a flaring end terminating in a pair of prongs, and a spring urging said sleeve-like member toward the head on said extension, said head limiting the projection of said sleeve-like member to a position with said prongs projecting beyond said head.

6. In a calf weaner, a body portion comprising a pair of curved members connected together to provide a pair of movable jaws, a post-like member projecting from said body portion, a headed reduced extension on said post-like member, a sleeve-like member mounted on said extension, said sleeve-like member having a flaring end terminating in a pair of prongs, and a spring urging said sleeve-like member toward the head on said extension, said head limiting the projection of said sleeve-like member to a position with said prongs projecting beyond said head.

7. In a calf weaner, a loop-like body portion having radiating spikes and adapted to rest on a surface with said body portion and spikes extending substantially parallel to said surface, and having spikes projecting upwardly from said body portion while resting on such surface, said spikes comprising spring projected retractable prongs and guard means projecting at least as far as said prongs when retracted.

8. In a calf weaner, a body portion, a pair of post-like members projecting from said body portion, a retractable pronged member mounted on each of said post-like members, a guard for said pronged member projecting endwise beyond said retractable member in its retracted position, and yielding means for projecting said pronged member endwise beyond said guard.

JOHN T. MARTIN.

CERTIFICATE OF CORRECTION.

Patent No. 2,252,894. August 19, 1941.

JOHN T. MARTIN.

It is hereby certified that error appears in the printed specification of the above numbered patent requiring correction as follows: Page 2, second column, line 24, claim 1, for the word "plan" read --plane--; and that the said Letters Patent should be read with this correction therein that the same may conform to the record of the case in the Patent Office.

Signed and sealed this 14th day of October, A. D. 1941.

(Seal)

Henry Van Arsdale,
Acting Commissioner of Patents.